United States Patent [19]
Kubota et al.

[11] Patent Number: 5,396,374
[45] Date of Patent: Mar. 7, 1995

[54] METHOD AND APPARATUS FOR REPRODUCING AND AFTER-RECORDING DIGITAL INFORMATION SIGNALS ON MAGNETIC TAPE

[75] Inventors: Yukio Kubota; Keiji Kanota, both of Kanagawa; Hajime Inoue, Chiba, all of Japan

[73] Assignee: Sony Corporation, Tokyo, Japan

[21] Appl. No.: 976,448

[22] Filed: Nov. 13, 1992

[30] Foreign Application Priority Data

Nov. 15, 1991 [JP] Japan ................. 3-327007

[51] Int. Cl.6 .................. G11B 5/02; G11B 27/02; H04N 5/78; H04N 5/76
[52] U.S. Cl. ..................... 360/27; 360/13; 360/19.1; 358/343
[58] Field of Search ........... 360/27, 19.1, 77.14, 360/77.15, 13, 14.1; 358/343

[56] References Cited

U.S. PATENT DOCUMENTS 4,533,963 5/1985 Nakano et al. ............ 360/19.1
4,559,568 12/1985 Watanabe et al. ............. 360/48
4,573,089 2/1986 Maeda et al. ............. 360/77.15

FOREIGN PATENT DOCUMENTS 0263546 4/1988 European Pat. Off. .
0449276 3/1991 European Pat. Off. .
0449276A 10/1991 European Pat. Off. .
0456433A 11/1991 European Pat. Off. .

OTHER PUBLICATIONS

J. Watkinson "The Art of Digital Audio" 1990, Focal Press, London, GB chapter 11, paragraph 11.10.2.

Primary Examiner—Aristoteli M. Psitos
Assistant Examiner—Jennifer Pearson Wright
Attorney, Agent, or Firm—William S. Frommer; Alvin Sinderbrand

[57] ABSTRACT

Methods and apparatus are provided for recording and reproducing digital information signals including image and audio portions in successive tracks on a magnetic tape. An ID signal is produced for one of an image portion and an audio portion of a corresponding digital information signal to be recorded. The ID signal indicates whether the portion is to be after-recorded in a respective track. The ID signal is combined with the portion to form a recording signal. Previously recorded digital information signals are reproduced from the track and an ID signal thereof is obtained. The recording of the portion in the track is controlled based on the reproduced ID signal.

12 Claims, 11 Drawing Sheets

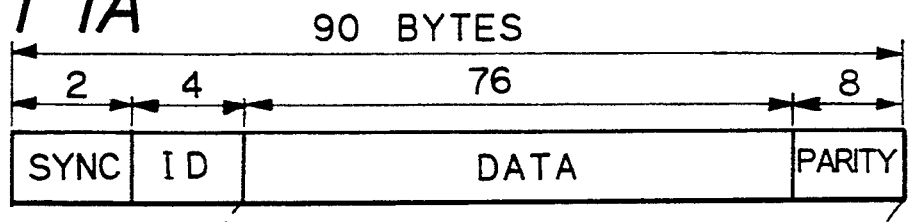
Fig.11A
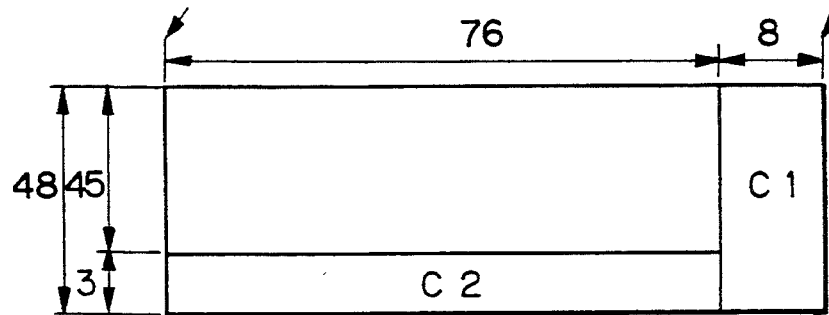
Fig.11B
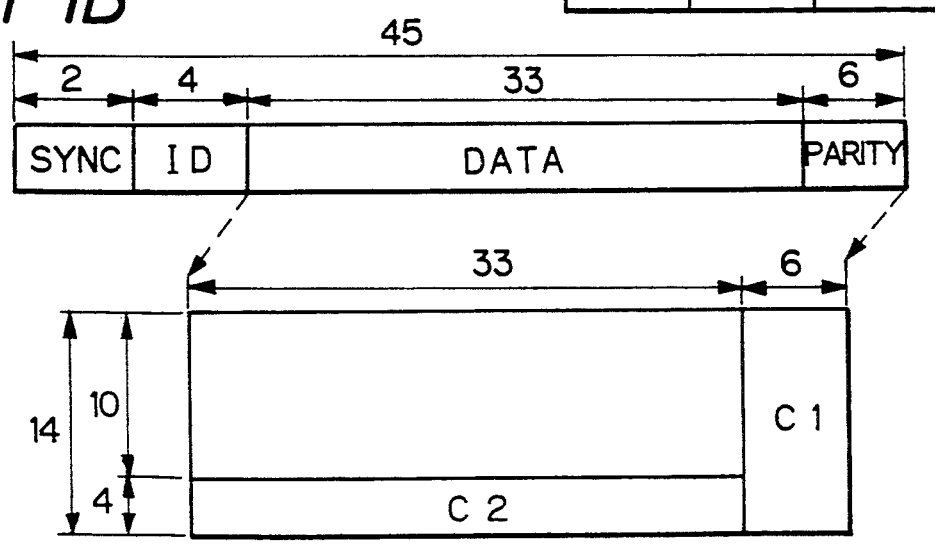
Fig.11C
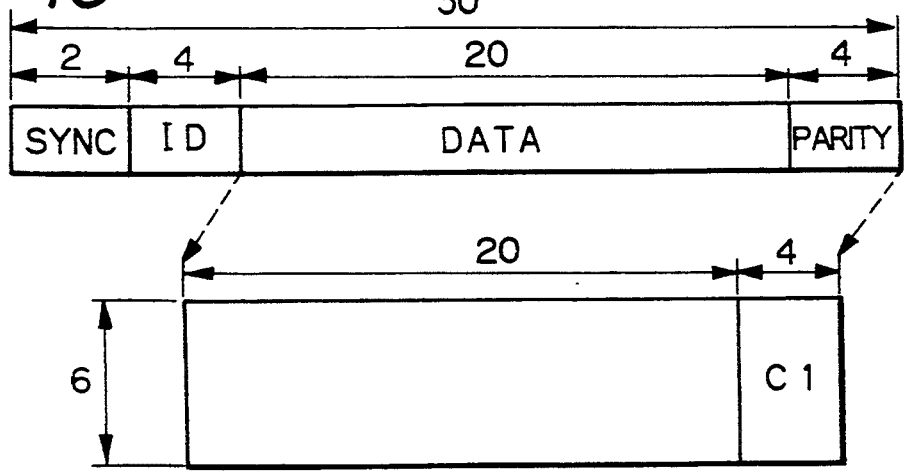

Fig.12
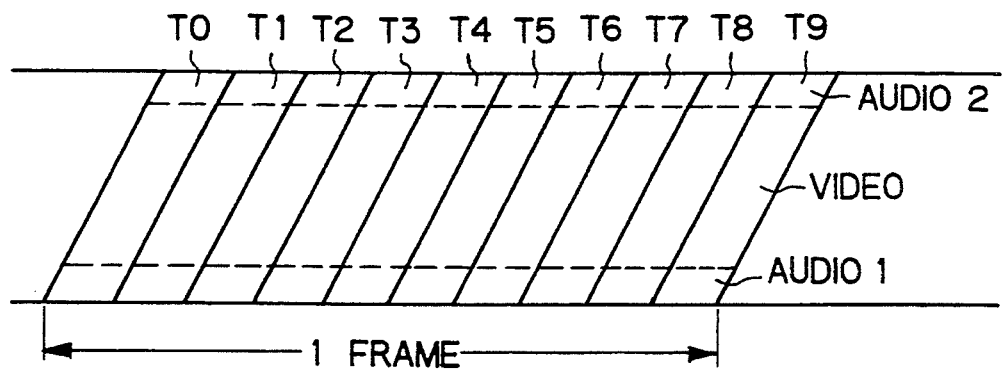
Fig.13
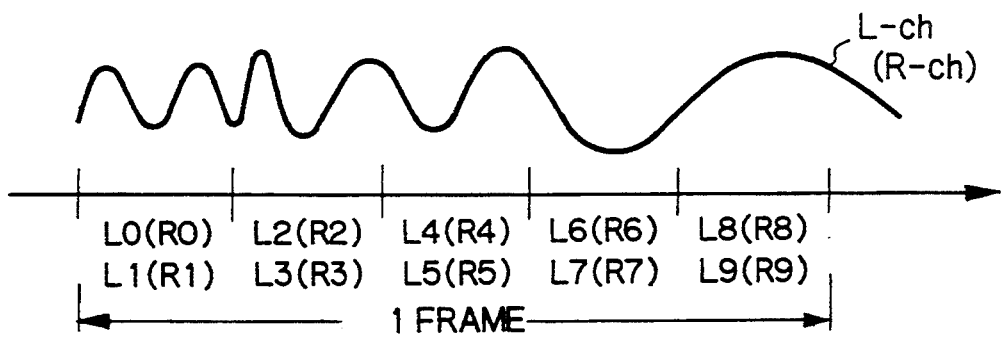
Fig.14A
|         | T0 | T1 | T2 | T3 | T4 | T5 | T6 | T7 | T8 | T9 |
|---------|----|----|----|----|----|----|----|----|----|----|
| AUDIO 2 | L1 | L3 | L5 | L7 | L9 | R1 | R3 | R5 | R7 | R9 |
| AUDIO 1 | R0 | R2 | R4 | R6 | R8 | L0 | L2 | L4 | L6 | L8 |
Fig.14B
| AUDIO 1/2 | L1 | L3 | L5 | L7 | L9 | R1 | R3 | R5 | R7 | R9 |
|-----------|----|----|----|----|----|----|----|----|----|----|
|           | R0 | R2 | R4 | R6 | R8 | L0 | L2 | L4 | L6 | L8 |
Fig.15
| AUDIO 1/2 | L1 | L2 | L5 | L6 | L9 | R1 | R2 | R5 | R6 | R9 |
|-----------|----|----|----|----|----|----|----|----|----|----|
|           | R0 | R3 | R4 | R7 | R8 | L0 | L3 | L4 | L7 | L8 |

METHOD AND APPARATUS FOR REPRODUCING AND AFTER-RECORDING DIGITAL INFORMATION SIGNALS ON MAGNETIC TAPE

BACKGROUND OF THE INVENTION

The present invention relates to methods and apparatus for reproducing and after-recording digital data in tracks on a magnetic tape.

Digital VTRs for digitizing and recording color video signals on magnetic tape are in commercial use. These digital VTRs are categorized as "D1" format component VTRs and "D2" format composite digital VTRs, which are employed commonly in broadcasting stations.

In the first-developed D1 format component VTR, a luminance signal and first and second color difference signals are converted to digital from analog form using sampling frequencies of 13.5 MHz and 6.75 MHz, respectively. After these signals are appropriately processed, they are recorded on a magnetic tape. Since the ratio of the component sampling frequencies is (4:2:2), the D1 format is also referred as a (4:2:2) system.

In the later-developed D2 format digital VTR, composite color video signals are converted to digital from analog form with a sampling frequency four times the frequency fsc of the color subcarrier signal. After these signals are appropriately processed, they are recorded on magnetic tape.

Since the D1 and D2 digital VTRs are designed principally for use in broadcasting stations, the quality of the pictures produced thereby is accorded the highest priority. Accordingly, the digital color video signal, digitized at eight bits per sample, is not substantially compressed as recorded on magnetic tape. The consequently large amount of data per field is not easily accommodated in a single track as the influence of improper linearity in the tracks can substantially degrade system operation. Accordingly, the D1 format digital VTR employs a segmenting technique wherein ten tracks are employed to record each field of an NTSC-type signal, while twelve tracks are employed to record each field of a PAL-type signal. This consequently shortens the length of each track thus to reduce the influence of improper linearity even where track pitch is narrow.

Digital VTRs record digital audio signals as well as tracking pilot signals in the tracks, in addition to the digital image signal. The D1 format digital VTR records audio data in the center of each track, while recording time code and tracking control signals in the longitudinal direction of the tape. The D2 format VTR records audio data at opposite ends of each track and, like the D1 device, records time code and tracking control signals in the longitudinal direction of the tape.

In both the recording and reproducing modes of these devices, data errors sometimes occur. Thus, the digital image signal, as well as the digital audio signal and a subcode signal recorded therewith are encoded to provide error correction codes. To do so, the data is arranged in matrix format and product codes are formed therefrom, such that line codes are formed using the rows of the matrix and column codes are formed using the columns thereof. It will be seen, therefore, that each data symbol is included in two error correction code sequences when the product code is thus formed. Thus, a highly effective error correction capability can be achieved.

In conventional digital VTRs, fixed heads are utilized for recording and reproducing the tracking and time code signals. Consequently, the tape transport mechanism is fairly complex, thus tending to degrade the reliability of the tape path. It is, therefore, preferable to record the tracking and additional control data in the tracks, so that fixed heads may be eliminated.

In each track, respective recording section are provided for the digital image and audio signals, as well as for the subcode. Accordingly, after-recording requires precise control to ensure that the data is recorded in the desired section of each track. One control technique employs a detection signal synchronized with the phase of the rotary head drum to define the after-recording area. However, this technique requires greater mechanical accuracy of the magnetic or optical detectors employed than may be achieved. Consequently, the use of this control technique can result in the erasure of the previously recorded data.

OBJECTS AND SUMMARY OF THE INVENTION

It is an object of the present invention to provide methods and apparatus for reproducing and after-recording digital video signals on magnetic tape which alleviate the above-described shortcomings and problems inherent in the prior art.

A further object of the present invention is to provide such methods and apparatus which can define an after-recording area on a magnetic tape with improved precision.

In accordance with an aspect of the present invention, a method and an apparatus are provided for recording and reproducing digital information signals including respective image portions and audio portions in successive tracks on a magnetic tape, the digital information signals including ID signals each indicating whether a corresponding digital information signal is recorded in an after-recording mode in a corresponding one of the successive tracks of the magnetic tape, the method and apparatus comprising the steps of and the means for, respectively: producing the digital information signals; producing an ID signal for at least one of an image portion and an audio portion of a corresponding digital information signal to be recorded in a respective one of the successive tracks, the ID signal indicating whether the at least one of the image portion and the audio portion is to be after-recorded in the respective one of the successive tracks; combining the ID signal with the at least one of the image portion and the audio portion to form a recording signal; recording the recording signal in the respective one of the successive tracks; reproducing digital information signals from the respective one of the successive tracks; obtaining a reproduced ID signal from the reproduced digital information signals; and defining at least one section of the respective one of the successive tracks for recording the recording signal based on the reproduced ID signal. Since the recording section is defined based on the reproduced ID signal, it is possible to determine whether the previously recorded digital information signals from the respective track are after-recorded signals. Since after-recorded signals are often recorded in imprecisely defined regions, steps may be taken to ensure that the newly after-recorded signals are positioned based on originally recorded signals of the track which are positioned far more precisely.

The above, and other objects, features and advantages of the invention, will be apparent in the following detailed description of certain advantageous embodiments thereof which is to be read in connection with the accompanying drawings forming a part hereof, and wherein corresponding parts and components are identified by the same reference numerals in the several views of the drawings.

BRIEF DESCRIPTION OF THE DRAWINGS

FIGS. 11A through 11C are diagrams for illustrating product code compositions for video data, audio data and subcode data, respectively, as formed by the FIG. 1 embodiment;

FIG. 12 schematically illustrates the track format for recording NTSC signals with the use of the disclosed embodiment;

FIG. 13 is an analog representation of one channel of a PCM audio signal corresponding with one frame of an NTSC signal;

FIGS. 14A and 14B illustrate interleaving techniques for PCM audio signals corresponding with an NTSC video signal for use in a soft tape mode and a user recording mode, respectively;

FIG. 15 illustrates a further interleaving technique for PCM audio signals corresponding with an NTSC video signal in the user recording mode;

DETAILED DESCRIPTION OF AN ADVANTAGEOUS EMBODIMENT

Figure 1:
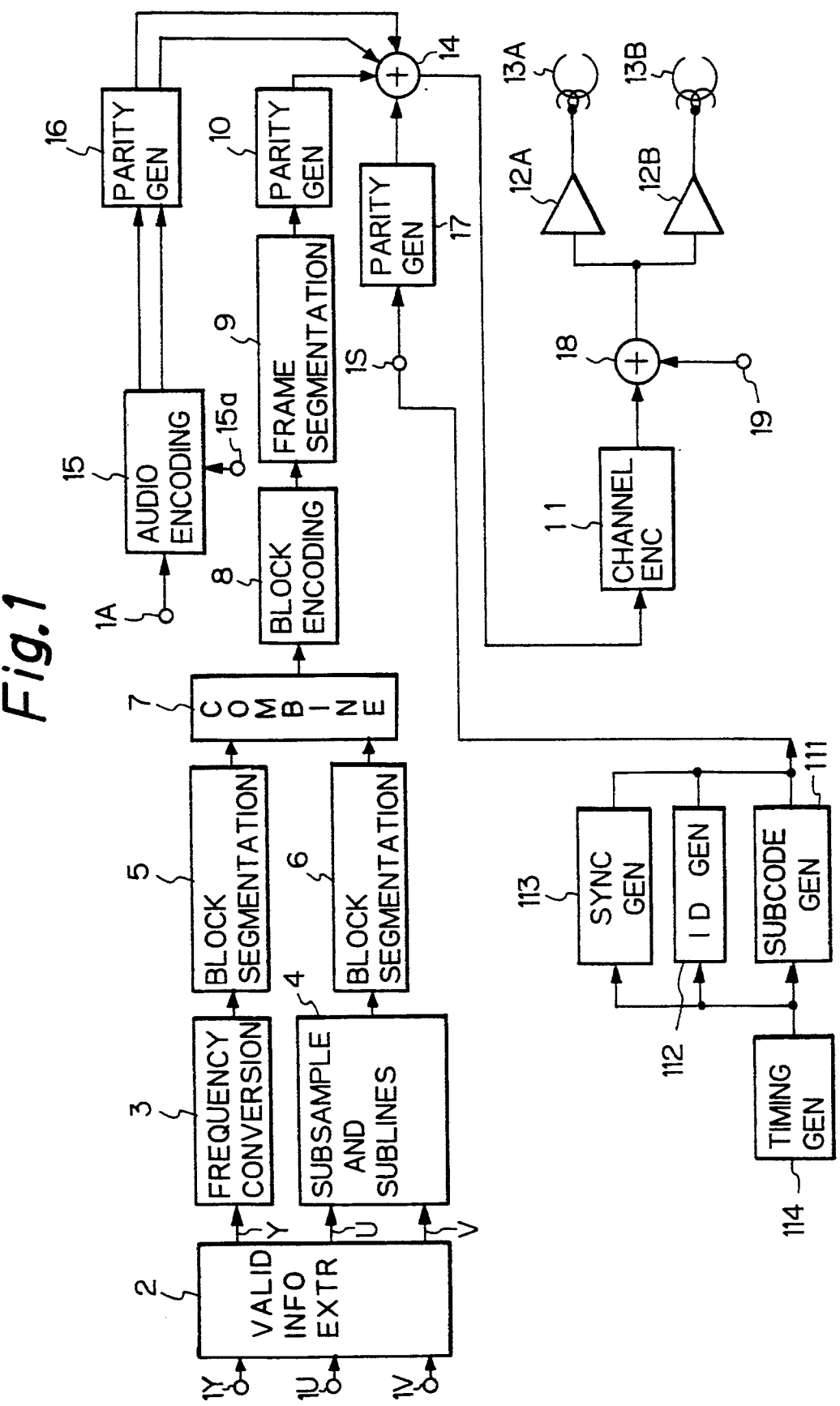
FIG. 1 is a block diagram of a recording signal processing system of a digital VTR in accordance with an embodiment of the present invention.

An embodiment of a digital VTR in accordance with the present invention will now be described in detail in the following topical order:
1. Overall Description
2. Channel Encoder and channel Decoder
3. Head and Tape System
4. Track Format
5. Data Arrangement
6. Interleaving and Error Correction of Audio Signals
7. Composition of ID Data and Definition of After-Recording Area 1. Overall Description FIG. 1 illustrates in block format a recording signal processing system of a digital VTR in accordance with an advantageous embodiment of the present invention. A digital luminance signal Y and digital color difference signals U and V, which are formed from three primary color signals R, G and B, are received at input terminals 1Y, 1U and 1V, respectively. The three primary color signals R, G and B are provided, for example, by a color video camera. In this case, the clock rates of the luminance and color difference signals are the same as those of the corresponding signals utilized in the above-described D1 VTR, so that the Y signal has a sampling frequency of 13.5 MHz, and that of the U and V signals is, in each case, 6.75 MHz, while each sample is provided as an eight bit word. A valid information extraction circuit 2 reduces the amount of data within the signals Y, U and V by removing blanking interval data therefrom while retaining the data therein from the effective picture area.

The luminance signal Y, after removal of the blanking interval data therefrom, is provided at an output of the circuit 2 coupled with an input of a frequency conversion circuit 3. The circuit 3 serves to reduce the sampling frequency of the luminance signal from 13.5 MHz to a rate three-fourths thereof and provides the thus-converted luminance signal to the input of a block segmentation circuit 5. The block segmentation circuit 5 converts the luminance signal received in line sequential format into a series of blocks for subsequent block encoding and supplies the thus-converted luminance signal to a combining circuit 7.

Figure 2:
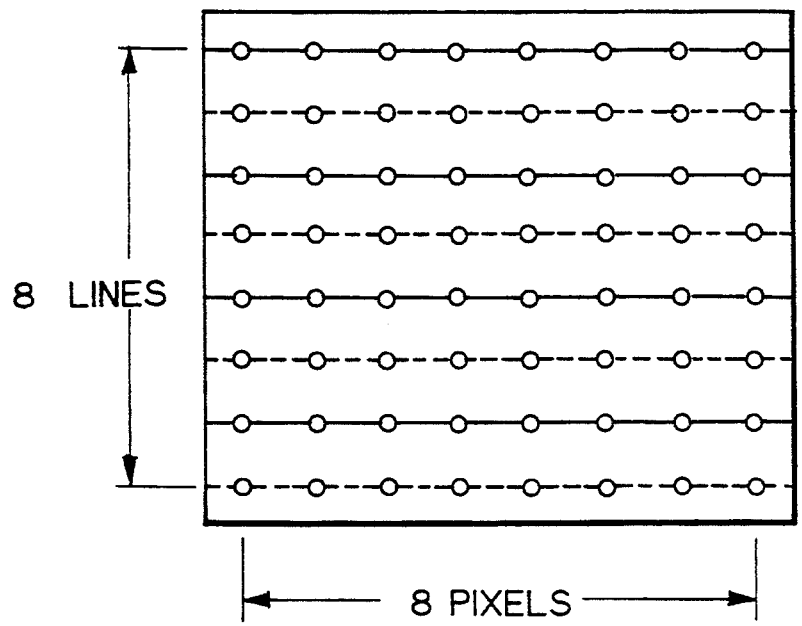
FIG. 2 schematically illustrates an (8×8) luminance signal block for encoding as a unit.

FIG. 2 schematically illustrates the arrangement of an (8×8) element luminance signal block to be encoded as a unit by one or more of discrete cosine transformation (DCT), adaptive dynamic range coding (ADRC), and the like. In FIG. 2, each pixel is illustrated as a circle, and the solid and broken lines represent odd and even field lines, respectively.

Figure 3:
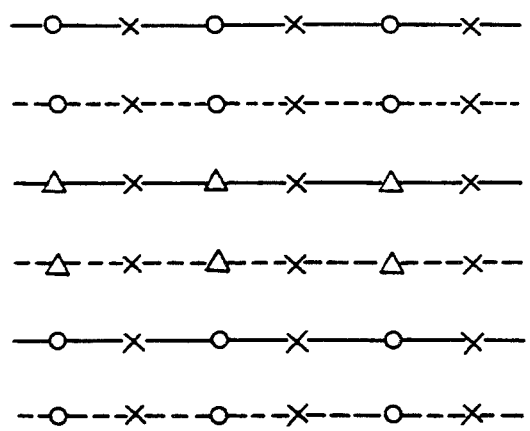
FIG. 3 schematically illustrates a technique for sub-sampling and sub-line selection for reducing the sampling frequency of color difference signals.

After removal of blanking interval information therefrom by the circuit 2, the two color difference signals U and V are provided to respective inputs of a sampling and sub-line circuit 4. The circuit 4 serves to reduce the sampling frequency of each of the two color difference signals from 6.75 MHz to one-half thereof and then selects alternate pairs of color difference signal lines to be assembled into a single channel of data which it then outputs as a line sequential digital color difference signal. The output signal from the circuit 4 is illustrated schematically in FIG. 3 wherein circles represent remaining picture elements of the first color difference signal U, while the triangular symbols represent remaining picture elements of the second color difference signal V, and the cross symbols represent positions of picture elements which have been removed from the two color difference signals by the circuit 4.

The line sequential color difference signals output by the circuit 4 are provided thereby to a block segmentation circuit 6 which, like the circuit 5, converts the line sequential color difference data into a sequence of data blocks. Like the block segmentation circuit 5, the circuit 6 converts the color difference data into (8×8) blocks which it then supplies to the combining circuit 7.

The combining circuit 7 serves to combine the luminance signal and the color difference signal supplied in block-sequential form from the circuits 5 and 6, respectively, into a one-channel combined signal which the circuit 7 provides to a block encoding circuit 8. The circuit 8 carries out one or more encoding techniques such as adaptive dynamic range coding, discrete cosine transformation, or the like. The signal as encoded by the circuit 8 is output thereby to a frame segmentation circuit 9 which converts the received signal into data frames, converting the data from a picture system clock to a recording system clock.

A pulse code modulated (PCM) audio signal is received at an input terminal 1A and supplied therefrom to an audio encoding circuit 15 which serves to compress the audio data by means of differential pulse code modulation (DPCM). As will be described in greater detail hereinbelow, the audio encoding circuit 15 interleaves the audio data in response to a mode signal received at an input terminal 15a thereof designating one of a user recording mode and a soft tape mode, described in greater detail hereinbelow. After encoding, the audio data is output by the circuit 15 to a parity generating circuit 16 which encodes the same in the form of a product code, to provide an error correction capability. The audio data and resulting parities are supplied by the parity generating circuit 16 to a first input of a mixing circuit 14.

As will be explained in greater detail hereinbelow, audio data is recorded in two separate sections of each track, designated audio 1 and audio 2, respectively. The audio encoding circuit 15, together with the parity generating circuit 16, produce the audio data for recording in the audio 1 and audio 2 sections. In a user recording mode of the digital VTR, all data may be recorded in a selected one of the audio 1 and 2 sections, while after-recording is disabled in an anti-theft mode of the digital VTR. As an alternative to the arrangement illustrated in FIG. 1, the output of the audio encoding circuit 15 may be supplied instead to the frame segmentation circuit 9, so that the audio data is recorded with the image data.

A parity generating circuit 10 receives the data output by the frame segmentation circuit 9 to produce error correction codes therefor, thus adding parities to the received data. The error correction encoded data is supplied by the parity generating circuit 10 to a respective input of the mixing circuit 14 to be combined with audio and subcode data for recording on magnetic tape.

The subcode data is produced by a subcode generating circuit 111 and is combined with ID data produced by an ID generating circuit 112 together with synchronization signals produced by a sync generating circuit 113. The circuits 112 and 113 also serve to produce ID signals and sync signals for the audio and video sync blocks. Appropriate timing signals for the circuits 111, 112 and 113 are produced by a timing generating circuit 114. The subcode can represent certain control signals generated, for example, in response to key operations by a user.

The subcode, ID data and synchronization signals are supplied to a parity generator circuit 17 via an input terminal is, for generating appropriate error correction codes, thus adding corresponding parities to the received data. The thus-encoded subcode and ID data, and synchronization signals are supplied by the parity generator 17 to a respective input of the mixer circuit 14 to be combined with the audio and image data for recording, as mentioned above.

The mixing circuit 14 combines the image, audio and subcode data for recording in respective sections of the sequential tracks on the tape as described in greater detail hereinbelow. The data thus mixed by the circuit 14 is provided to a channel encoder 11 which serves to attenuate a low band of the data prior to recording. The data as processed by the encoder 11 is supplied thereby to a respective input of a further mixing circuit 18 which receives a pilot signal at a second respective input to enable automatic track following. The pilot signal is a low frequency signal so that the same may be separated from the recorded data when it is reproduced. The data as mixed by the circuit 18 is provided thereby to magnetic heads 13A and 13B through respective recording amplifiers 12A and 12B and appropriate rotary transformers (not shown for purposes of simplicity and clarity), so that the data may be recorded on magnetic tape.

Figure 4:
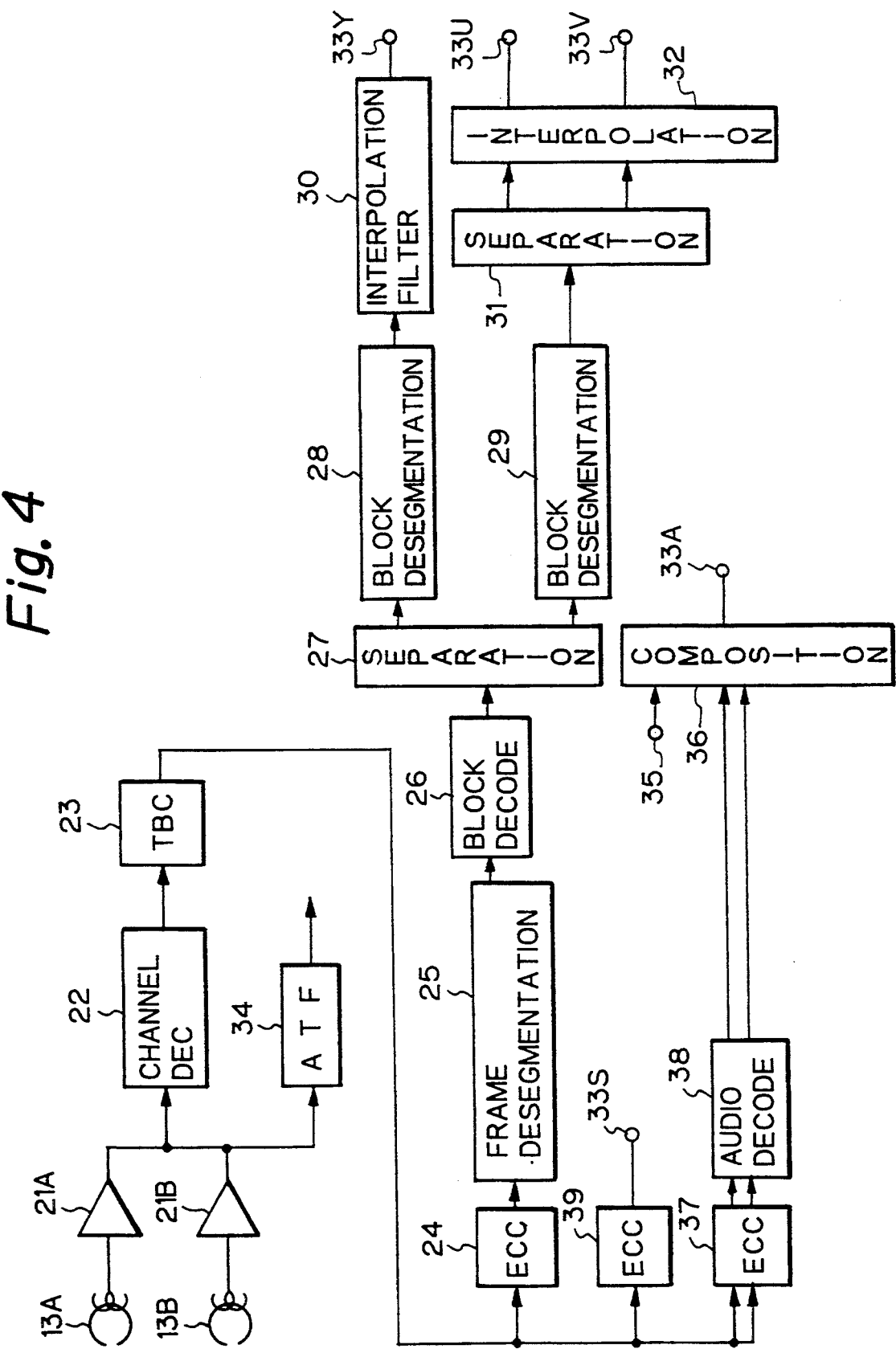
FIG. 4 is a block diagram of a reproduction processing system of the FIG. 1 embodiment.

Referring now to FIG. 4, the reproduction signal processor system of the disclosed digital VTR receives data reproduced from a magnetic tape by the heads 13A and 13B which supply the reproduced data to respective reproducing amplifiers 21A and 21B. The data, as thus amplified, is supplied to a channel decoder 22 and an automatic track following (ATF) circuit 34. The channel decoder 22 serves to demodulate the reproduced data and provide the demodulated data to a time base compensation (TBC) circuit 23. The TBC circuit 23 removes time base fluctuating components present in the reproduced signal. The AFT circuit 34 produces a tracking error signal based on a beat component present in the reproduced pilot signal, so that the tracking error signal may be provided to a capstan servo system of the digital VTR (not shown for purposes of simplicity and clarity), which carries out automatic track following in essentially the same manner as a conventional 8-mm VTR.

The time base compensated data from the circuit 23 is provided to error correction circuits (ECC) 24, 37 and 39 which serve to correct and modify errors present in the reproduced data with the use of the error correction codes accompanying the data as reproduced. More specifically, the ECC 24 corrects and modifies errors within the reproduced image data, while the ECC's 37 and 39 perform the same function for the audio data and subcode, respectively, reproduced from respective track sections dedicated thereto. The error corrected audio data is supplied by the circuit 37 to an audio decoding circuit 38 for decoding the audio signal which was compressed and encoded prior to recording. The reproduced subcode, after error correction by the circuit 39 is provided to an output terminal 33S for provision to a system controller (not shown for proposes of simplicity and clarity) for controlling the overall operations of the digital VTR. The image data, as error corrected, is supplied by the circuit 24 to a frame desegmentation circuit 25.

The frame desegmentation circuit 25 serves to separate each component within the block-encoded image data, while exchanging the recording system clock thereof with a picture system clock. The various data separated by the frame desegmentation circuit 25 is provided thereby to a block decoding circuit 26 which decodes the block encoded data to retrieve the original data therefrom. The compressed encoded audio signal is decoded by the circuit 38 and, as decoded, is supplied thereby to a composition circuit 36 to reproduce separate channels of audio data contained therein. The composition circuit 36 operates either in a soft tape mode or a user recording mode, under the control of a mode ID signal separated from the reproduced data by the frame desegmentation circuit 25 or by the audio decoding circuit 38. In the soft tape mode, the composition circuit 36 provides two channels of audio data by constructing each from data contained in both the audio 1 and audio 2 sections of the scanned tracks. In the user recording mode, both channels of audio signals are separately recorded in the audio 1 and 2 sections, and are likewise supplied as separate channels of audio data by the composition circuit 36.

The image data decoded by the block decoding circuit 26 is supplied thereby to a separation circuit 27 which separates the luminance and color difference signals from the decoded data. The luminance and color difference signals thus supplied by the circuit 27 are provided thereby to respective block desegmentation circuits 28 and 29. The circuits 28 and 29 convert the received signals in block sequential form into signals in raster scanning sequence, so that the operations of the circuits 28 and 29 complement those of the block segmentation circuits 5 and 6 of the recording signal processing system illustrated in FIG. 1.

The luminance signal output by the block desegmentation circuit 28 is provided thereby to an interpolation filter 30 which converts the sampling rate of the received luminance signal from 3 fs to 4 fs, where 4 fs is equal to 13.5 MHz. As thus converted, the luminance signal is supplied by the interpolation filter 30 to an output terminal 33Y.

The digital color difference signals output by the block desegmentation circuit 29 are provided thereby to a separation circuit 31 which separates the received signals U and V therefrom. The separated signals U and V are supplied by the separation circuit 31 to an interpolation circuit 32 which utilizes the received data to reconstruct the lines and individual picture element data that were thinned out prior to recording. The circuit 32 outputs digital color difference signals U and V having a sampling rate of 4fs at respective output terminals 33U and 33V, respectively.

2. Channel Encoder and Channel Decoder

Figure 5:
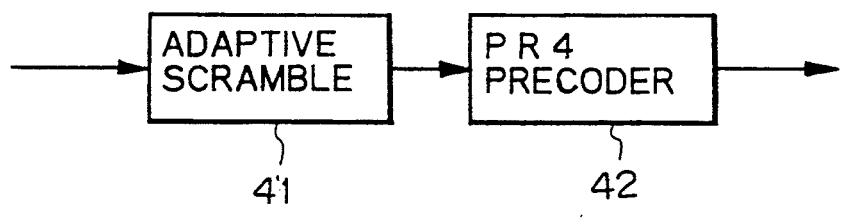
FIG. 5 is a block diagram of a channel encoder of the recording signal processing system of FIG. 1.
Figure 6:
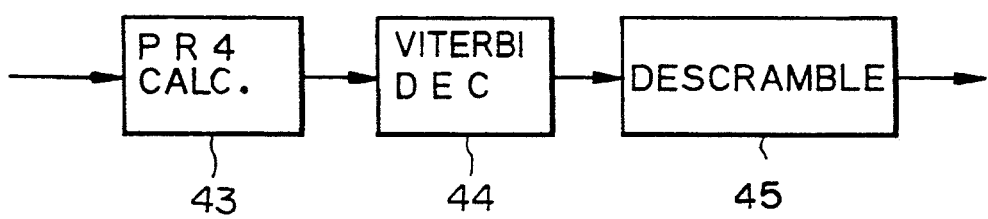
FIG. 6 is a block diagram of a channel decoder of the reproduction processing system of FIG. 4.

The channel encoder 11 of the recording signal processing system illustrated in FIG. 1, and the channel decoder 22 of the reproduction signal processing system of FIG. 4, are illustrated in greater detail in FIGS. 5 and 6, respectively. Further details of the channel encoder 11 and channel decoder 22 are provided in Japanese Patent Application HEI 1-143491, filed by the assignee of the present application.

Referring now to FIG. 5, the channel encoder 11 includes an adaptive scrambling circuit 41 which receives the output of the mixing circuit 14. The circuit 41 includes M system scrambling circuits, where M>1. The output of one of the M system scrambling circuits is selected in operation wherein both the high frequency component therein and a DC component therein have the smallest values relative to the signal input to the circuit 41. The output selected by the circuit 41 is supplied to a partial response class 4 detection-type precoder 42. The precoder 42 carries out a calculation of $1/(1-D^2)$, where D represents a unit delay. After processing by the precoder 42, the data is supplied to the magnetic heads 13A and 13B via the recording amplifiers 12A and 12B, respectively.

In the reproduction mode of the digital VTR, the heads 13A and 13B reproduce the recorded signals and supply the same to the reproduction amplifiers 21A and 21B of FIG. 4, as described hereinabove. The thus-amplified signals are received by the channel decoder 22, illustrated in greater detail in FIG. 6. Referring to FIG. 6, the channel decoder 22 includes a partial response class 4 processing circuit provided with the outputs of the amplifiers 21A and 21B which carries out a calculation of (1+D) for the received data. As thus processed by the circuit 43, the data is supplied thereby to a Viterbi decoding circuit 44 which carries out a correlation and probability-based calculation in a known manner to supply decoded data having a high noise resistance. The data as thus processed by the Viterbi decoding circuit 44 is provided thereby to a descrambling circuit 45 which restores the data to its original form as supplied to the channel encoder 11 of FIG. 5. The use of the Viterbi decoding circuit 44 serves to improve the C/N ratio by 3 dB over that provided in decoding bit-by-bit.

3. Mead and Tape System

Figure 7A:
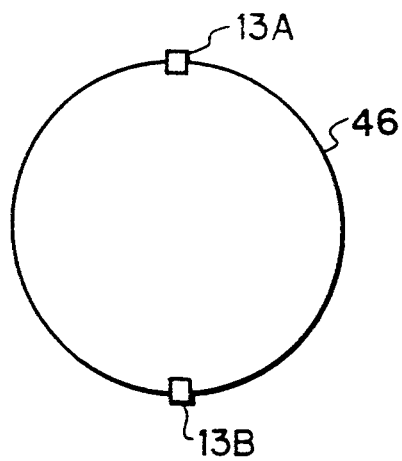
FIGS. 7A and 7B schematically illustrate alternative rotary recording/reproducing head arrangements which may be employed in the disclosed embodiment of the present invention.
Figure 7B:
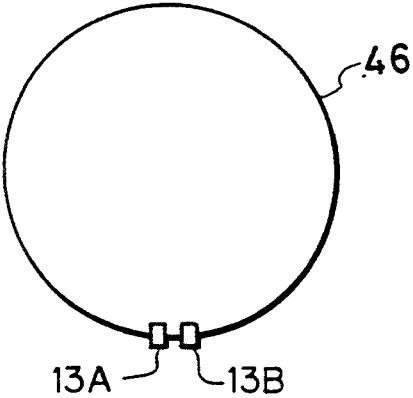

FIG. 7A illustrates an exemplary arrangement of the magnetic heads 13A and 13B in diametrically opposed positions on a rotational drum 46. In the alternative, as illustrated in FIG. 7B, the magnetic heads 13A and 13B made by mounted on the drum 46 in a closely-spaced arrangement. In operation, a magnetic tape (not shown for purposes of simplicity and clarity) is wound obliquely about the peripheral surface of the drum 46 to an angular extent of approximately 180°. It will be seen that, in the use of the head arrangement as illustrated in FIG. 7A, the heads 13A and 13B alternately engage the magnetic tape, while in the case of the arrangement of FIG. 7B, both heads scan the magnetic tape simultaneously.

Figure 8:
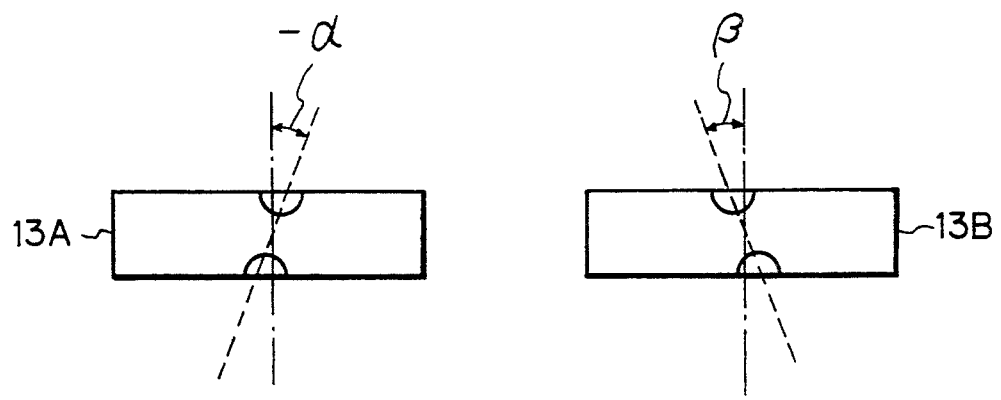
FIG. 8 illustrates the azimuth angles of respective recording/reproducing heads as illustrated in FIGS. 7A and 7B.
Figure 9:
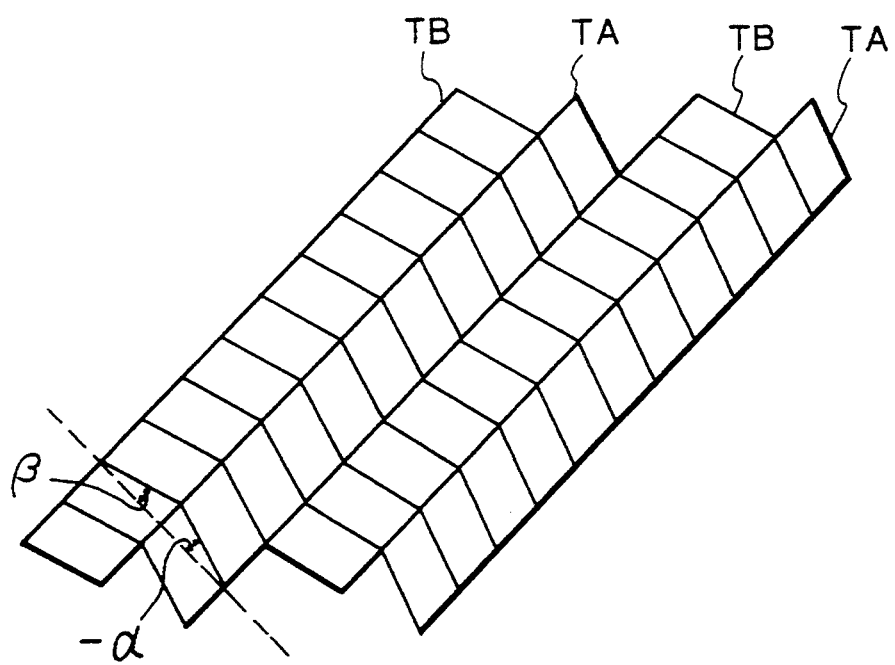
FIG. 9 schematically illustrates recording patterns formed in successively arranged slant recording tracks on a magnetic tape as formed by the recording/reproducing heads of FIGS. 7A and 7B.

The angular dispositions of the gaps formed in the magnetic heads 13A and 13B, which define their respective azimuth angles, differ, as illustrated in the example of FIG. 8. As shown in FIG. 8, the azimuth angles $\alpha$ and $\beta$ of the heads 13A and 13B, respectively, are fixed, for example, at ±20°. Due to the difference in the azimuth angles of the two heads, the recording pattern as illustrated schematically in FIG. 9 is formed on the magnetic tape. As shown in FIG. 9, adjacent tracks TA and TB formed by the magnetic heads 13A and 13B, respectively, have differing azimuth angles. Accordingly, when the signals recorded in the respective tracks of the magnetic tape are reproduced, the consequent azimuth loss advantageously reduces the cross-talk from adjacent tracks.

4. Track Format

Figure 10:
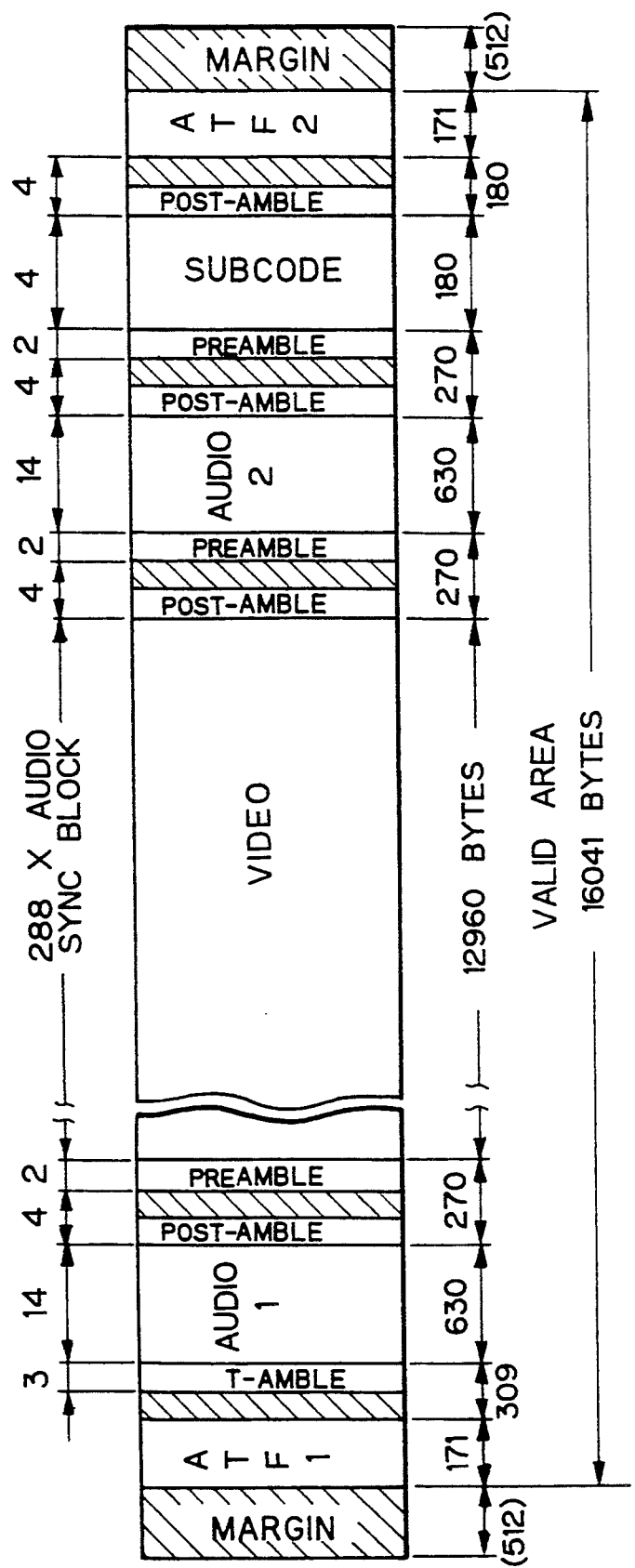
FIG. 10 is a diagram illustrating the arrangement of the component sections of an exemplary recording track formed on a magnetic tape by the FIG. 1 embodiment.

Referring now to FIG. 10, an exemplary track as formed by the heads 13A and 13B is illustrated schematically therein. As seen in FIG. 10, the exemplary track is divided into a plurality of sections disposed at respective locations along the scanning direction thereof. The track is formed by a respective one of the heads scanning from the left to the right as illustrated in FIG. 10. The margins of the tape and the inter-block gaps (IBGs) are shown as hatched areas in FIG. 10 and no data is recorded therein. The track preamble (T-Amble) section, as well as the preamble and postamble sections as illustrated in FIG. 10 disposed at corresponding ends of each data recording section, record pulse signals having a bit frequency equal to that of the recorded data, so that a phase locked loop (PLL) of the reproduction system (not shown for purposes of simplicity and clarity) may lock its frequency to that of the signals reproduced from these sections of the track in order to extract a bit clock of the proper frequency.

As noted above, corresponding margins are disposed at either end of each track. Pilot signal recording sections ATF1 and ATF2 adjoin each of the margins at the scan commencement and scan termination ends of the tracks, respectively. The sections ATF1 and ATF2 record pilot signals for use in automatic track following. The pilot section ATF1 is followed, in turn, along the scanning direction of the track by a first audio signal recording section, audio 1, then by a video signal recording section, a second audio signal recording section, audio 2, followed by a subcode recording section and finally, the pilot signal recording section ATF2. As indicated in FIG. 10, the valid area of the track is 16,041 bytes long.

The pilot signal recording sections ATF1 and ATF2 are recorded at the ends of the track since the head does not contact the tape stably at these locations. In the high-speed reproduction mode, the tape transport speed is significantly faster than in the recording mode and the head contacts the tape more stability at the scan termination side than at the scan commencement side. Consequently, the subcode recording section is disposed at the scan termination side of the track to improve the quality of the reproduced subcode in the high-speed reproduction mode.

The data is recorded on the tape in a large number of sync blocks, each of which is composed of a sync block synchronization signal, a block ID representing the position of the block on the screen, data, and error correction parities, in that order. The length of each sync block varies depending upon the type of data it contains, whether video, audio or subcode, since the amount of information therein differs. In this example, the length of each recording and non-recording section of each track, with the exception of the ATF pilot signal recording sections ATF 1 and 2, are measured in units corresponding with the length of an audio sync block and each is an integer number of audio sync blocks long. As illustrated in FIG. 10, the length of each audio section, designated at audio 1 and audio 2, is 14 audio sync blocks long. The length of the video section is 288 audio sync blocks long, while the length of the subcode section is 4 audio sync blocks long. The lengths of the track preamble, section preamble and postamble sections are as shown in FIG. 10.

Since each of the track sections is an integer number of audio sync blocks long, the design of the timing control circuitry for defining each section in the recording and reproducing modes is simplified.

5. Data Arrangement

FIG. 11A illustrates the arrangement of the video data as recorded. As shown, each video sync block is 90 bytes long, and includes a 2-byte block synchronization signal at the beginning thereof, followed by 4 bytes of ID data, 76 bytes of video data and 8 parity bytes. An error correction code for the video data is produced by arranging the data in a (76 bytes×35 bytes) matrix and generating product codes therefor. In other words, 76 bytes of data in each row of the matrix are used to produce inner codes, thus yielding an 8 byte parity, referred to as a "C1" parity. Each column of the matrix, including 45 bytes, is used to produce outer codes, thus yielding a 3 byte parity referred to as a "C2" parity. Reed-Solomon coding can be employed, for example, for generating the error correction codes. Each data matrix, as illustrated in FIG. 11A, includes one-third of the data in a given track, so that three groups of codes are recorded in a video section thereof.

Referring to FIG. 11B, the arrangement of the audio data as recorded is illustrated schematically therein. Each audio sync block is 45 bytes long, beginning with a 2-byte block synchronization signal, followed by 4 bytes of ID data, 33 bytes of audio data, and a 6 byte parity. Like the video data, the audio data is encoded in the form of product codes to provide an error correction capability. That is, the audio data is arranged in respective matrices each including 33 bytes per row and 10 bytes per column. The rows of each matrix are each used to produce an inner code, thus yielding a parity "C1" having 6 bytes, while the audio data in each column of the matrix is used to produce an outer code, thus forming a parity "C2" having 4 bytes.

The product code format as illustrated in FIG. 11B is employed both for data recorded in the audio section 1 and for that recorded in the audio section 2, as well as for each audio channel. In the user recording mode, each sample includes 8 bits. In the soft tape mode, each sample includes 16 bits. As will be described in greater detail hereinbelow, in the soft tape mode, audio sections 1 and 2 each record a respective one of the left (L) and right (R) audio channels. The respective channel data contained in each section is formed into corresponding product codes in the form as illustrated in FIG. 11B. In the user recording mode, audio data from both of the L and R channels are recorded in each section. Accordingly, in the user recording mode, data from both channels is used to produce each of the product codes. In the user recording mode, the data of one respective channel is recorded in the first half of a given audio section, while the data of the other channel is recorded in the second half thereof.

FIG. 11C schematically illustrates the arrangement of data as recorded in the subcode section of each track. Each subcode sync block is 30 bytes long, commencing with a 2-byte block synchronization signal, followed by 4 bytes of ID data, 20 bytes of subcode data, and a 4 byte parity, in that order. In the case of the subcode, the 40 bytes of data contained in pairs of adjacent lines are used to form an inner code to provide an error correction capability but an outer code is not produced using the subcode data. More specifically, as shown in FIG. 11C, the 40 bytes of data contained in two adjacent rows of a (20 byte×6 byte) data matrix is encoded to form a respective inner code, thus to yield an 8 byte "C1" parity. 4 bytes of the 8 byte parity thus produced are appended to each line to record the "C1" parity.

Since the inner code parity formed when encoding the subcode is 8 bytes long, it can be arranged in the same form as the inner code of the video data. This permits the use of a single encoding circuit to form the inner code for each of the different types of data. Shorter sync blocks are more likely to be reproduced as valid data in the high-speed reproduction mode than are longer sync blocks. Accordingly, the amount of data in each subcode sync block is selected as 20 bytes, rather than 40, to shorten its length so that a greater amount of the subcode data is reproduced in the high-speed reproduction mode, to reliably permit detection of the tape's position from the subcode.

It will thus be seen that the respective sizes of each sync block of video data, audio data and subcode form a ratio of integers of (90:45:30=6:3:2). Accordingly, even though sync blocks of different lengths are contained in each track, the necessary timing control circuitry is advantageously simplified. Moreover, the lengths of the block synchronization signals are the same in each of the various types of sync blocks, as are the lengths of each of the ID signals. Also, the data format of the ID signals is commonly shared among the various types of sync blocks. Consequently, the circuitry used to generate and process such data can be commonly employed.

6. Interleaving and Error Correction of Audio Signals

In the NTSC system, having 525 scanning lines per frame and 60 fields per second, the data of each frame is recorded in 10 tracks, designated T0 through T9, as illustrated in FIG. 12. As described above, the disclosed embodiment of the invention records audio data in separate sections, audio 1 and audio 2, in each track separated by a video data section thereof. For example, PCM signals including two channels of audio corresponding with each video frame interval, having a sampling frequency of 48 KHz and linearly quantized with 16 bits per sample, are recorded in the audio 1 and 2 sections of the corresponding 10 tracks of that frame.

FIG. 13 provides an analog representation of the left channel of a PCM audio signal coinciding with one frame period of a corresponding NTSC video signal. In the NTSC signal, the PCM audio signal sequence of each frame period is divided into five (N=5) contiguous intervals each including sequential samples of audio data, so that the audio data spanning one frame period is recorded over 2N tracks. Even-numbered samples of the first PCM audio interval are assembled as a group represented as L0 for recording in a predetermined section of a respective track. A sequence L1 which contains the odd-numbered samples of the first PCM audio signal interval is likewise assembled as a group for recording in a predetermined track section. In like manner, sequences which contain even-numbered samples of the second, third, fourth and fifth intervals of each PCM audio signal sequence corresponding with each frame, represented as L2, L4, L6 and L8, respectively, are assembled for recording in the same fashion. In addition, groups of odd numbered samples from the second, third, fourth and fifth intervals of the PCM audio signal sequence of each frame, represented as L3, L5, L7 and L9, respectively, are likewise assembled. The PCM audio signals of the right (R) channel within the same frame interval are divided in the same manner into five intervals each including two groups of which each includes a respective one of the odd and even numbered samples of its interval. The groups are designated R0 through R9, wherein corresponding numbered groups of the left and right channels include samples corresponding in time.

These PCM audio signal groups are interleaved and encoded to provide error correction codes, and are recorded in this form in the predetermined track sections. As mentioned above, both a soft tape mode and user recording mode are provided for recording the PCM audio signals. The soft tape mode, for example, is used by movie production companies to create soft tapes while the user recording mode is employed, for example, by an individual to record data of personal interest. In the soft tape mode, each sample of the PCM audio signal includes 16 bits. On the other hand, in the user recording mode, each sample is composed of 8 bits. Thus, the amount of PCM data representing the audio signal produced in the user recording mode is half that produced in the soft tape mode. In addition, it is possible to use differing sample frequencies for the two modes so that the ratio of their respective amounts is the same.

FIG. 14A illustrates a technique for interleaving the grouped PCM audio signals corresponding with an NTSC video signal in the soft tape mode. The groups L1, L3, L5, L7 and L9 are recorded in the audio 2 sections of the tracks T0 through T4 recording each frame, while the groups R0, R2, R4, R6 and R8 are recorded in the audio 1 sections of the same tracks. The groups R1, R3, R5, R7 and R9 are recorded in the audio 2 sections of tracks T5 through T9 of each frame, while the groups L0, L2, L4, L6 and L8 are recorded in the audio 1 sections of the these tracks.

FIG. 14B illustrates a technique for interleaving the grouped PCM audio signals corresponding with an NTSC video signal in the user recording mode. In this mode, as noted above, the amount of data is half that in the soft tape mode for the same time interval. Thus, the same PCM audio signal can be recorded in both audio sections of each track in the same format as in the soft tape mode. As an example, audio data groups L1 and R0 are recorded in the audio 1 section of track T0, and in tracks T1 through T9, the groups L3 and R2, L5 and R4, L7 and R6, L9 and R8, R1 and L0, R3 and L2, R5 and L4, R7 and L6, and R9 and L8 are recorded, respectively, in both audio sections thereof. In this example, the audio 1 section of each track is divided into first and second half portions such that, in the first half portion, the data recorded in the audio 2 section in the soft tape mode, that is, L1, L3, . . . , and R9 as illustrated in FIG. 14B, are recorded, while in the second half portion, the data recorded in the audio 1 section during the soft tape mode, that is, R0, R2, . . . , and L8, are recorded.

FIG. 15 provides a further example of an interleaving technique for use in the user recording mode. In the example of FIG. 15, the recording positions of audio data groups L2, R2, L6 and R6, as illustrated in FIG. 14B, are exchanged with those of groups L3, R3, L7 and R7, respectively. The interleaving technique of FIG. 15 can be similarly applied for use in the soft tape mode. In the interleaving technique as shown in FIG. 15, the PCM audio signal of each frame is divided into N intervals. These intervals are allocated between the first and second groups of 2N tracks recording each frame and separately recorded therein.

Figure 16:
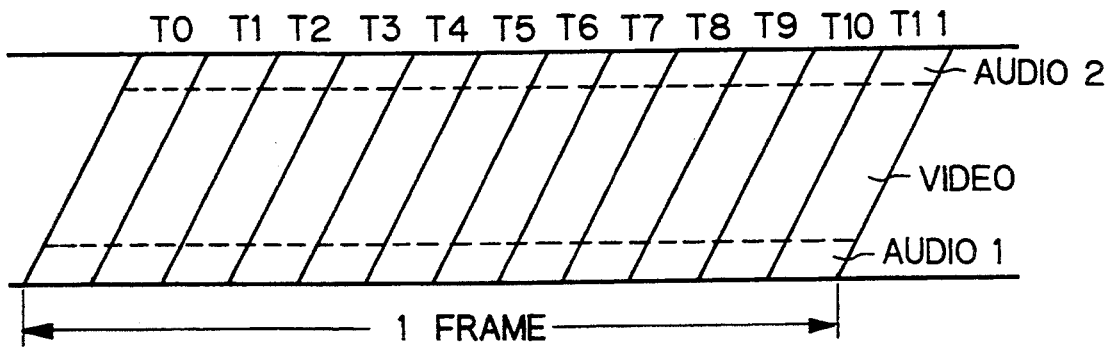
FIG. 16 schematically illustrates the track format for recording PAL signals with the use of the disclosed embodiment.

In the PAL system which employs 625 scanning lines and 50 frames per second, the data of each frame is divided into tracks T0 through T11 (so that 2N=12), as illustrated in FIG. 16. Thus, the PCM audio signal of each frame period is divided into six (N=6) intervals over 12 tracks. The PCM audio signal is interleaved from section to section in the various tracks.

Figure 17:
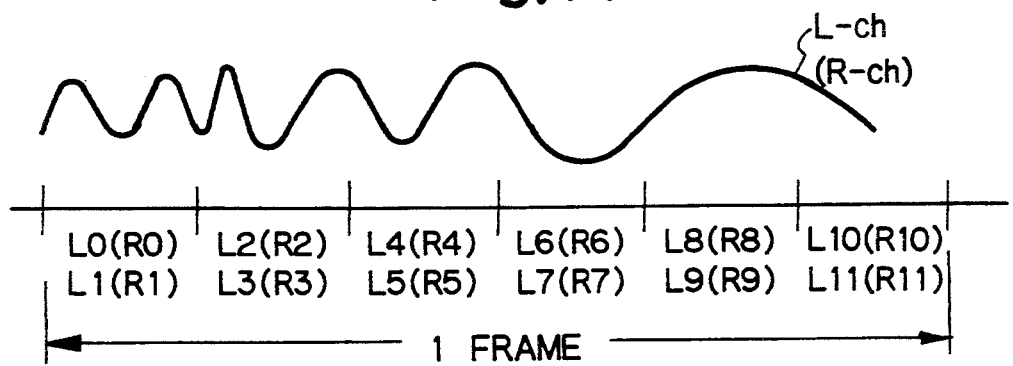
FIG. 17 is an analog representation of one channel of a PCM audio signal corresponding with one frame of a PAL video signal.

FIG. 17 provides an analog representation of the left (L) channel of a PCM audio signal spanning one frame interval of a PAL video signal. The PCM audio signal of each frame interval is divided into six contiguous intervals. The PCM audio signal sequence contained in each interval is divided into respective sequences or groups each having either even-numbered samples, that is, groups L0, L2, . . . , and L10, or odd-numbered samples, that is, groups L1, L3, . . . , and L11. In like manner, the right (R) channel PCM audio signal of each PAL frame interval is divided into groups of odd and even numbered samples from respective audio intervals and designated R0 through R11.

Figure 18A:
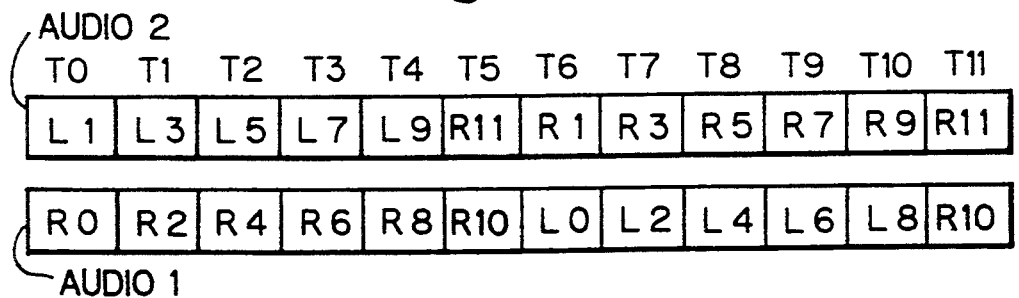
FIGS. 18A and 18B illustrate interleaving techniques for PCM audio signals corresponding with a PAL video signal for use in a soft tape mode and a user recording mode, respectively.
Figure 18B:
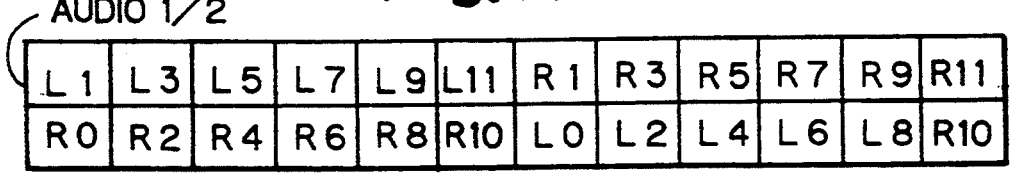

As illustrated in FIG. 18A, in the soft tape mode different groups of audio data are recorded in the two audio sections of each track, such that even and odd numbered sequences within respective groups of each audio channel are interleaved as distributed among the tracks T0 through T11. Like the example of FIG. 14A, the even/odd group interleaving sequence is different in tracks T6 through T11 as compared with the sequence in tracks T0 through T5. In the user recording mode, as illustrated in FIG. 18B, the interleaving technique allocates the same samples to the audio 1 and 2 sections of each track, such that within each section the signals are interleaved between first and second half portions thereof in the same manner as between the audio 1 and audio 2 sections of each track in the soft tape mode.

When an error occurs in the reproduced data due to a scratch in the tape, to dust or to fingerprints thereon, the magnitude of the error may exceed the capability of the system to correct in its entirety, so that correction is carried out to the extent possible and the data which has been lost must be reconstructed from validly reproduced data. The above-described interleaving process provides a superior error reconstruction capability.

Figure 19A:
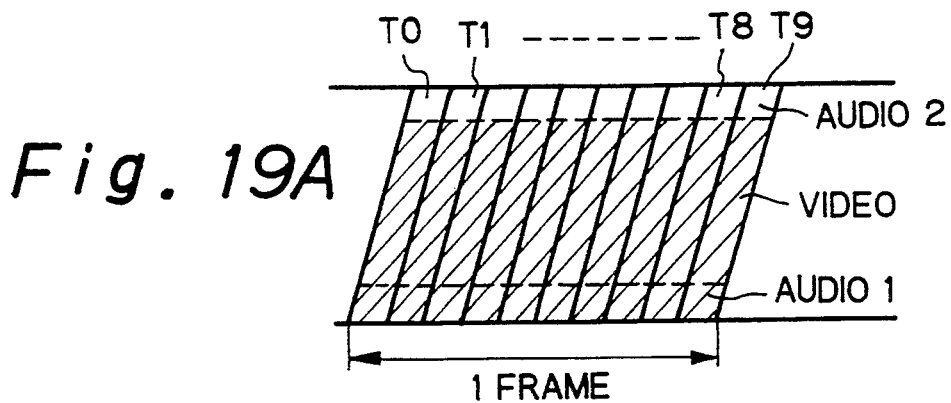
FIGS. 19A and 19B provide examples of data errors which may occur in a magnetic tape.

Next, with reference to FIGS. 19A and 19B, the error reconstruction capability available in the soft tape mode will now be described. In this example, as illustrated in FIG. 19A, a data error extends both in the lateral and longitudinal directions of a tape, represented therein as a hatched area. Accordingly, in this case, audio data can be reproduced only from the audio 2 section. Referring again to FIG. 14A, odd-numbered samples of the left channel in groups L1, L3, L5, L7 and L9 and the odd-numbered samples of the right channel, R1, R3, R5, R7 and R9, are nevertheless obtained as valid data despite the assumed error. By using these odd-numbered samples, the missing even-numbered samples can be reconstructed. As an example, the average values of samples both following and preceding an erroneous sample may be used to produce an average value to be substituted therefor.

Figure 19B:
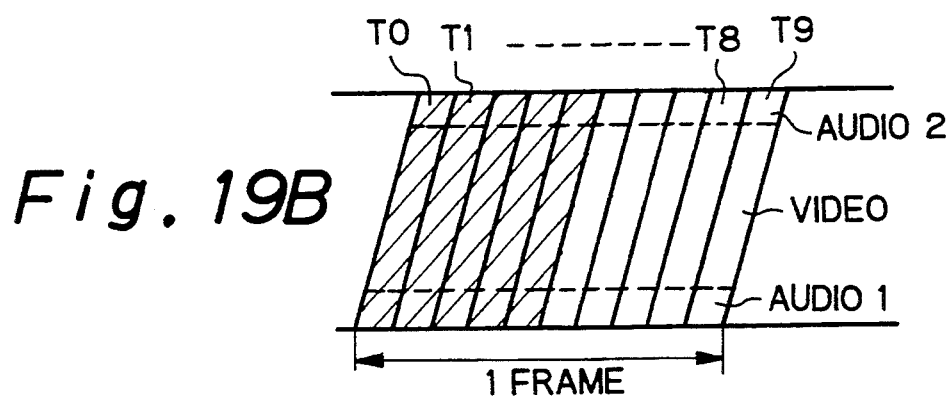

As a further example, it is assumed that data within the hatched area of FIG. 19B has been lost due to an error, so that the data in both of the audio 1 and audio 2 sections of tracks T0 through T4 are affected. It will be seen from FIG. 14B that the valid data obtained from groups R1, R3, R5, R7 and R9 together with groups L0, L2, L4, L6 and L8 may be employed to reconstruct the lost data of each channel through interpolation.

In the user recording mode, a similarly effective error correcting capability is provided. Since the user recording mode records the same data in both audio sections of each track, it may be thought that the loss of data from a given section may be compensated by substituting data from the other. However, since the audio data can also be after-recorded, it is not certain in all instances that the data will be same in both sections. In this case, errors are corrected or compensated discretely in each section.

Figure 20A:
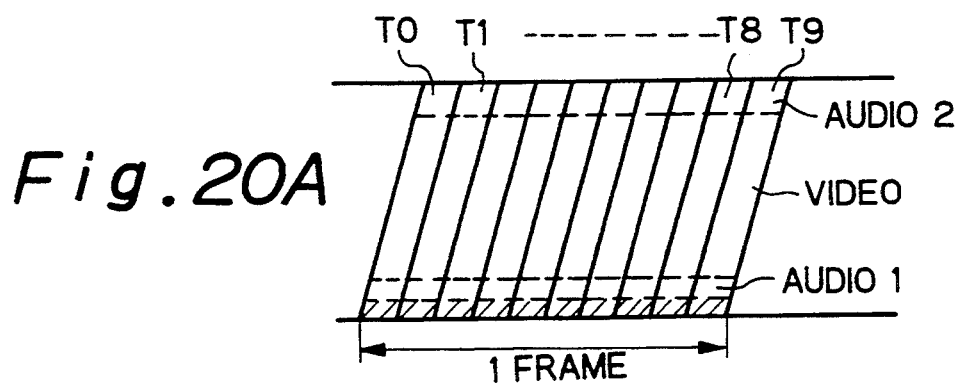
FIGS. 20A and 20B provide further examples of data errors which may occur in the magnetic tape.

With reference to FIG. 20A, an example of a longitudinal defect in a magnetic tape caused, for example, by a scratch resulting from a defect in the tape transport system, has rendered the data reproduced from a first half of the audio 1 section erroneous. Consequently, the PCM audio signal groups in this half of the audio 1 section, that is, R0, R2, . . . L6 and L8 as illustrated in FIG. 14B have been lost. On the other hand, the data in the upper half of the section, that is, groups L1, L3, . . . , R7, and R9, are valid. In this case, the lost data can be reconstructed through average value interpolation.

Figure 20B:
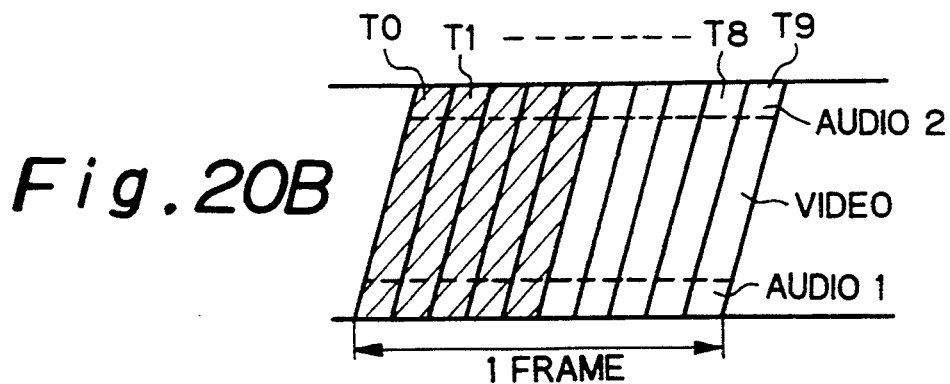

FIG. 20B provides an example of data lost from tracks T0 through T4 where it is assumed that the data was recorded in the user recording mode. It will be seen that, by using the valid data from the remaining tracks T5 through T9, the erroneous data can be reconstructed.

Figure 21:
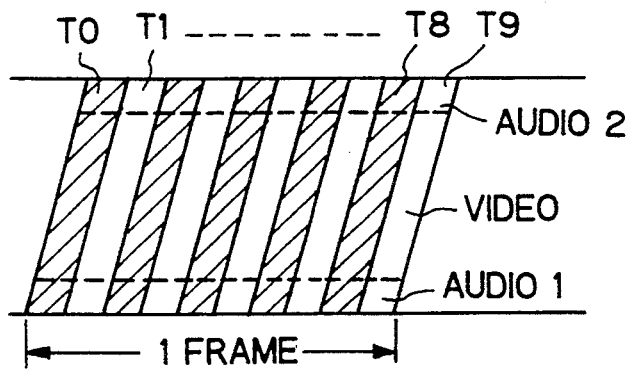
FIG. 21 is an example of data loss occurring when one of the pair of magnetic heads employed in the disclosed digital VTR embodiment becomes clogged.

When data is recorded with the use of a pair of heads, as in this embodiment, one head sometimes becomes clogged. When this occurs, valid data can be reproduced from only every other track. In the example of FIG. 21, it is assumed that the data in tracks T0, T2, T4, T6 and T8 cannot be reproduced because one of the heads has become clogged. When this occurs, in the case both of data recorded in the soft tape mode and in the user recording mode, the odd-numbered data of the left channel and even-numbered data of the right channel become invalid. This data can, nevertheless, be reconstructed with the use of the data reproduced from tracks T1, T3, T5, T7 and T9.

7. Composition of the ID Data and Definition of After-Recording Area

Figure 22:
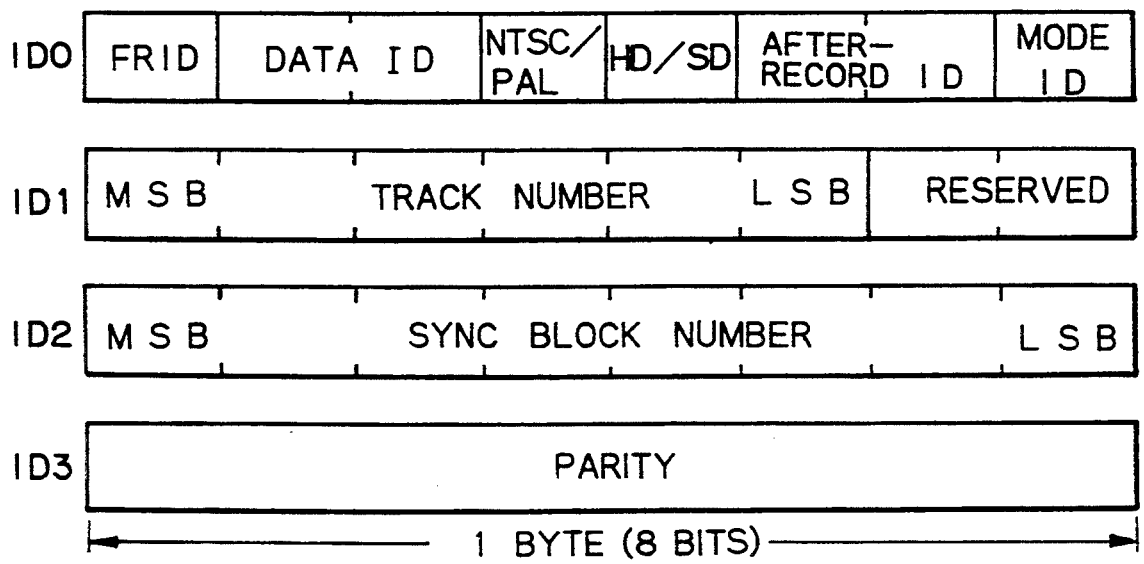
FIG. 22 schematically illustrates the format of an ID signal included in each sync block for both video and audio data as well as for the subcode, as formed by the embodiment of FIG. 1.

Next, with reference to FIG. 22, an exemplary format of an ID signal inserted into each sync block is illustrated therein. The ID signal format is common to the video and audio data, as well as the subcode. The ID signal includes four bytes of data labeled in sequence as ID0, ID1, ID2 and ID3.

ID0 includes a one-bit frame ID (FR-ID), a two-bit data ID, a two-bit broadcasting system-type ID, a two-bit after-recording ID and one-bit mode ID. The frame ID is inverted with each new frame. The data ID is used to distinguish the type of data within its sync block, whether video, audio 1, audio 2 or subcode. The broadcasting system-type ID includes one bit which is used to distinguish the NTSC (525/60) and PAL (625/50) signals and another bit which is used to distinguish HD (high resolution) and SD (standard resolution) video signals. The after-recording ID is used to distinguish after-recorded data from non-after-recorded data. The non-after-recording mode includes both recording on a blank tape as well as overwriting an entire track. In the non-after-recording mode, the tracking control pilot signals at both ends of the track are always rewritten. The mode ID is used to distinguish the soft tape mode and the user recording mode. The after-recording mode can be employed for after recording of all video, audio and subcode data.

ID1 includes six bits representing the track in which the data is recorded and a spare two-bit recording area. The track number data represents the track number assigned to each of the 2N tracks of each frame. Since it is anticipated that in the future image signals such as an HD signal having a large amount of information will be recorded with the use of the present invention, a relatively large number of bits are assigned for recording the track number data. In addition, the spare area is provided for recording any further ID which may be required in the future.

ID2 is block number including eight bits. A sync block number is assigned to each sync block of each track. ID3 is a parity generated to enable detection and correction of errors in the ID0, ID1 and ID2 bytes.

Figure 23:
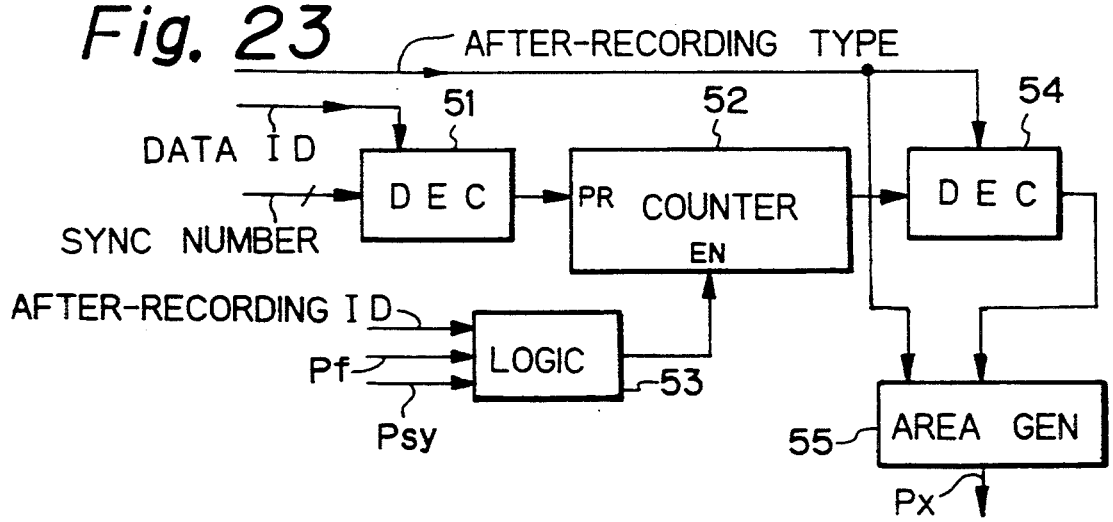
FIG. 23 is a block diagram of a control subsystem of the disclosed embodiment for use in generating a control signal to define an after-recording section in a track formed in a magnetic tape.

In the after-recording mode, the recording area should be precisely defined. Should the recording area deviate from that desired, previously recorded data not intended to be changed will be erased. If the non-recording areas such as the IBG's are widened to alleviate this problem, the recording destiny is disadvantageously reduced. FIG. 23 illustrates a subsystem for generating a control pulse for defining the after-recording area by using the above-mentioned after-recording ID.

In general, the after-recording area is defined by the subsystem of FIG. 23 in the following manner. First, the terminal position of the preceding recording section is detected. A position spaced apart from such terminal position on the tape by a predetermined number of sync blocks is selected as the start position of the after-recording area. The terminal position of the after-recording area is defined in accordance with the type of after-recorded data. For example, when video data is after-recorded the terminal position of the audio 1 section, more specifically, the last position of the next-encountered postamble, is detected. Thereafter, the number of sync blocks is counted using the pulses of the reproduced block synchronization signal to define the start position of the video section's preamble. Next, a further number of sync blocks is counted to define the terminal position of the video section's postamble. In this example, the video data area and the pre- and post-amble sections constitute the after-recording area.

However, if the data of the preceding section has been after-recorded, the position of a following after-recording area determined by counting the number of block synchronization pulses from the preceding after-recorded data section can be inaccurate. Thus, when the after-recording ID is detected in the data section preceding the area to be after-recorded, its block synchronization signal is not used to define the following after-recording section. If all of the data in the track preceding the after-recording area has been after-recorded, the pulses detected from the pilot signal recording section ATF1 at the start position of the track are used. Since the pilot signal has a predefined frequency, even though its data format does not correspond with the defined sync block format, it can nevertheless be employed for this purpose. Likewise, when data is to be after recorded in the audio 1 section, the detection pulses of the pilot signal are used.

The subsystem of FIG. 23 provides a means of defining the recording area for use in the disclosed embodiment. The subsystem of FIG. 23 includes a decoder 51 provided with the reproduced data ID and sync number. The decoder 51 generates preset pulses at the last sync block of the recording section preceding the area to be after recorded. The data ID is supplied to the decoder 51 since the number of the last sync block within any given data section depends on the type of data recorded therein.

The preset pulses are supplied to a counter 52 which serves to determine the start position of the after-recording area. A logic circuit 53 receives the after-recording ID, a pilot signal detection pulse Pf and a block synchronization pulse Psy. When the after-recording ID is at a low level representing the non-after-recording mode, the block synchronization pulses Psy are supplied from the logic circuit 53 to the counter 52. The logic circuit 53 defines the start position of the after-recording area in accordance with the block synchronization pulses of the after-recorded data.

The count generated by the circuit 52 is supplied to a decoder 54 which is also supplied with a signal representing the type of data to be after-recorded. The decoder 54 produces data representing the start position of the after-recording area based on the type of data to be after-recorded. An output of the decoder 54 is supplied to an after-recording area generating circuit 55 which is also supplied with a signal indicating the type of data to be after-recorded. The after-recording area generating circuit 55 defines the start position of the after-recording area based on the data from the decoder 54 and determines the terminal position of the area based on the start position as well as the type of after-recorded data. The after-recording area generating circuit 55 produces an after-recording area pulse Px having a high state beginning at the after-recording start position and switching to a low state at the terminal position of the after-recording area as determined in accordance with the type of after-recorded data.

When the heads read data from the start position of a track, ATF data is first reproduced. At this point, the data ID representing ATF-type data is input to the decoder 51 so that a corresponding preset value is loaded in the counter 52. The preset value in this case is the number of blocks from the start position of the T-amble to the start position of the audio 2 section, for example, 517 in this embodiment. The counter 52 proceeds to count the number of internally generated block synchronization pulses starting with the loaded value at least until a count representing the next data section is produced. When the heads read an audio section following the ATF section, they detect the after-recording ID for the data therein. At this point, if the after-recording ID indicates that the audio data has been recorded in the after-recording mode, the counter 52 continues to count the block synchronization pulses rather than presetting a new count number. On the other hand, when the after-recording ID indicates that the audio data of the section being scanned has not been recorded in the after-recording mode, a new preset value is loaded from the decoder 51 into the counter 52. The preset value in this example is the number of blocks from the start position of the video section preamble to the start position of the audio 2 section preamble, for example, 296. The counter 52 counts the number of pulses of the block synchronization signal Psy starting with the preset value. At this point, the counter 52 is enabled by the block synchronization pulses. When the section being read contains after-recorded data, the block synchronization pulses generated by the logic circuit 53 are input. When the section contains non-after-recorded data, the block synchronization signal Psy input to the logic circuit 53 are instead used as enabling pulses.

When data is after recorded in the audio 2 section, if the data in the preceding video section is not after-recorded, the counter 52 is preset at the last position of the video section's postamble. For example, after two block synchronization pulses are generated following the terminal position of the postamble, a signal representing the start position of the after-recording area is output by the decoder 54. In addition, by using this signal and the data representing the type of data to be after recorded, the after-recording area generating circuit 55 can detect the terminal position of the after-recording area. When the after-recording ID indicates that the video area has been after recorded, the terminal position of the preceding audio 1 section is detected. However, when its data has been after recorded, the detection pulse Pf from the ATF1 section is instead used.

The above mentioned after-recording area pulse Px is supplied as a control signal to the recording amplifiers 12A and 12B of FIG. 1. During the high state of the pulse Px, the recording amplifiers 12A and 12B become active. When necessary, the after-recording pulse Px is supplied to the reproducing amplifiers 21A and 21B to render them inactive.

It will be seen, therefore, that by recording an after-recording ID signal indicating whether or not accompanying data has been after recorded, the present invention provides the ability to avoid the use of data as a positional reference in the after-recording mode whose position may be inaccurate. Accordingly, a recording system provided with such information is enabled to define an after-recording area with greater accuracy thus to substantially reduce the likelihood that desired data will be erased inadvertently in the after-recording process.

Although a specific embodiment of the invention has been described in detail herein with reference to accompanying drawings, it is to be understood that the invention is not limited to that embodiment and that various changes and modifications may be effected therein by one skilled the art without departing from the scope or spirit of the invention as defined in the appended claims.

What is claimed is:

1. An apparatus for recording and reproducing digital information signals including respective image portions and audio portions in successive tracks on a magnetic tape, said digital information signals including ID signals each indicating whether a corresponding digital information signal is recorded in an after-recording mode in a corresponding one of the successive tracks of said magnetic tape, comprising:

digital signal processing means for producing said digital information signals;

ID means for producing an ID signal for at least one of an image portion and an audio portion of a corresponding digital information signal to be recorded in a respective one of the successive tracks, said ID signal indicating whether said at least one of the image portion and the audio portion is to be after-recorded in said respective one of the successive tracks;

combining means for combining said ID signal with said at least one of the image portion and the audio portion to form a recording signal;

means for recording said recording signal in said respective one of the successive tracks;

reproducing means for reproducing digital information signals from said respective one of the successive tracks;

means for obtaining a reproduced ID signal from the reproduced digital information signals; and control means for defining at least one section of said respective one of the successive tracks for recording said recording signal based on the reproduced ID signal, said control means comprising after recording detection means for determining whether data recorded in a previously recorded section of said respective one of the successive tracks preceding said at least one section thereof has been after recorded based on an ID signal reproduced from said previously recorded section and position means for defining a position of said at least one section within said respective one of the successive tracks based on a position of said previously recorded section in the event of a determination by the after-recording detection means that said previously recorded section has been recorded other than by after-recording.

2. The apparatus of claim 1, wherein said position means is operative to define the position of said at least one section based on reference position data stored within said previously recorded section and indicating a reference position within said respective one of the successive tracks.

3. The apparatus of claim 2, wherein said position means is further operative to define the position of said at least one section based on a scanning distance from said reference position to said at least one section.

4. The apparatus of claim 3, wherein said reproducing means is operative to reproduce a block synchronization signal from said respective one of the successive tracks and wherein said position means is operative to determine said scanning distance based on the reproduced block synchronization signal from said previously recorded section only when said previously recorded section has recorded other than by after-recording.

5. The apparatus of claim 1, wherein said reproducing means is operative to reproduce a tracking control pilot signal from an initial section of said respective one of the successive tracks and data from a plurality of previously recorded sections following said initial section and each having a respective ID signal recorded therein, and wherein said position means is operative to define said position of said at least one section based on said tracking control pilot signal when the ID signals of all of said plurality of previously recorded sections preceding the position of said at least one section indicate that all of the preceding previously recorded sections were after recorded.

6. An apparatus for recording and reproducing digital information signals including respective image portions and audio portions in successive tracks on a magnetic tape, said digital information signals including ID signals each indicating whether a corresponding digital information signal is recorded in an after-recording mode in a corresponding one of the successive tracks of said magnetic tape, comprising:

digital signal processing means for producing said digital information signals;

ID means for producing an ID signal for at least one of an image portion and an audio portion of a corresponding digital information signal to be recorded in a respective one of the successive tracks, said ID signal indicating whether said at least one of the image portion and the audio portion is to be after-recorded in said respective one of the successive tracks;

combining means for combining said ID signal with said at least one of the image portion and the audio portion to form a recording signal;

means for recording said recording signal in said respective one of the successive tracks;

reproducing means for reproducing digital information signals from said respective one of the successive tracks including a data-type signal from a previously recorded section of said respective one of the successive tracks preceding at least one section thereof indicating the type of data recorded in said previously recorded section;

means for obtaining a reproduced ID signal from the reproduced digital information signals; and control means for defining said at least one section of said respective one of the successive tracks for recording said recording signal based on the reproduced ID signal, said control means comprising means for determining whether data recorded in said previously recorded section has been after recorded based on an ID signal reproduced from said previously recorded section and position means for defining a position of said at least one section within said respective one of the successive tracks based on a position of said previously recorded section only if said previously recorded section has been recorded other than by after-recording, said position means being operative to define the position of said at least one section based on reference position data stored within said previously recorded section and indicating a reference position within said respective one of the successive tracks and a scanning distance from said reference position to said at least one section, the position means being operative to determine the scanning distance based on the data-type signal.

7. A method of recording and reproducing digital information signals including respective image portions and audio portions in successive tracks on a magnetic tape, said digital information signals including ID signals each indicating whether a corresponding digital information signal is recorded in an after-recording mode in a corresponding one of the successive tracks of said magnetic tape, comprising the steps of:

producing said digital information signals;

producing an ID signal for at least one of an image portion and an audio portion of a corresponding digital information signal to be recorded in a respective one of the successive tracks, said ID signal indicating whether said at least one of the image portion and the audio portion is to be after-recorded in said respective one of the successive tracks;

combining said ID signal with said at least one of the image portion and the audio portion to form a recording signal;

recording said recording signal in said respective one of the successive tracks;

reproducing digital information signals from said respective one of the successive tracks;

obtaining a reproduced ID signal from the reproduced digital information signals; and defining at least one section of said respective one of the successive tracks for recording said recording signal based on the reproduced ID signal by determining whether data recorded in a previously recorded section of said respective one of the successive tracks preceding said at least one section thereof has been after recorded based on an ID signal reproduced from said previously recorded section, and defining a position of said at least one section within said respective one of the successive tracks based on a position of said previously recorded section in the event of a determination based on the reproduced ID signal that said previously recorded section has been recorded other than by after-recording.

8. The method of claim 7, wherein the step of defining a position of said at least one section comprises defining the position of said at one section based on reference position data stored within said previously recorded section and indicating a reference position within said respective one of the successive tracks.

9. The method of claim 8, wherein the step of defining the position of said at least one section comprises defining the position thereof based on a scanning distance from said reference position to said at least one section.

10. The method of claim 9, wherein the step of reproducing digital information signals comprises reproducing a block synchronization signal from said respective one of the successive tracks, and wherein the step of defining the position of said at least one section comprises determining said scanning distance based on the reproduced block synchronization signal from said previously recorded section only when said previously recorded section has been recorded other than by after-recording.

11. The method of claim 7, wherein the step of reproducing digital information signals comprises reproducing a tracking control pilot signal from an initial section of said respective one of the successive tracks and a plurality of previously recorded sections following said initial section and each having a respective ID signal recorded therein, and wherein the step of defining said position of said at least one section comprises defining said position based on said tracking control pilot signal when the ID signals of all of said plurality of previously recorded sections preceding the position of said at least one section indicate that all of the preceding previously recorded sections were after recorded.

12. A method of recording and reproducing digital information signals including respective image portions and audio portions in successive tracks on a magnetic tape, said digital information signals including ID signals each indicating whether a corresponding digital information signal is recorded in an after-recording mode in a corresponding one of the successive tracks of said magnetic tape, comprising the steps of:

producing said digital information signals;

producing an ID signal for at least one of an image portion and an audio portion of a corresponding digital information signal to be recorded in a respective one of the successive tracks, said ID signal indicating whether said at least one of the image portion and the audio portion is to be after-recorded in said respective one of the successive tracks;

combining said ID signal with said at least one of the image portion and the audio portion to form a recording signal;

recording said recording signal in said respective one of the successive tracks;

reproducing digital information signals from said respective one of the successive tracks including a data-type signal from a previously recorded section of said respective one of the successive tracks preceding at least one section thereof indicating the type of data recorded in said previously recorded section;

obtaining a reproduced ID signal from the reproduced digital information signals; and defining said at least one section of said respective one of the successive tracks for recording said recording signal based on the reproduced ID signal, by determining whether data recorded in said previously recorded section has been after recorded based on an ID signal reproduced from said previously recorded section, and defining a position of said at least one section within said respective one of the successive tracks based on a position of said previously recorded section only if said previously recorded section has been recorded other than by after-recording, said position of said at least one section being based on reference position data stored within said previously recorded section and indicating a reference position within said respective one of the successive tracks and a scanning distance from said reference position to said at least one section, the scanning distance being determined based on the data-type signal.

* * * * *